United States Patent

[11] 3,603,797

| [72] | Inventors | Casimer J. Borkowski;<br>Manfred K. Kopp, both of Oak Ridge, Tenn. |
|---|---|---|
| [21] | Appl. No. | 18,125 |
| [22] | Filed | Mar. 10, 1970 |
| [45] | Patented | Sept. 7, 1971 |
| [73] | Assignee | The United States of America as represented by the United States Atomic Energy Commission |

[54] TWO-DIMENSIONAL POSITION-SENSITIVE RADIATION DETECTOR
8 Claims, 4 Drawing Figs.

[52] U.S. Cl. .................................................. 250/83.6 R, 250/83.6 FT
[51] Int. Cl. .................................................. G01t 1/18
[50] Field of Search ........................................... 250/83.3 R, 83.6 R, 83.6 FT

[56] References Cited
UNITED STATES PATENTS

| 2,551,576 | 5/1951 | Bailey | 250/83.6 R |
| 3,207,902 | 9/1965 | Sandborg | 250/83.3 R |
| 3,415,992 | 12/1968 | Webb | 250/83.3 R X |

Primary Examiner—Archie R. Borchelt
Assistant Examiner—Davis L. Willis
Attorney—Roland A. Anderson ABSTRACT: A two-dimensional position-sensitive detector has been provided to measure the coordinates of the location and the energy loss of charged particles and ionizing radiation. The device comprises an ordered array of high resistance collector wires strung in parallel. Adjacent wires are interconnected at both ends by a series of resistors so as to form a four output terminal network. A comparison of the rise times of the output pulses from these four terminals gives the coordinates of an ionizing event within the sensitive area of the detector. The amplitude of the sum of the four output pulses gives the energy loss of the event in the detector gas.

INVENTORS.
Casimer J. Borkowski
Manfred K. Kopp
BY
ATTORNEY.

TWO-DIMENSIONAL POSITION-SENSITIVE RADIATION DETECTOR

BACKGROUND OF THE INVENTION

The present invention was made during the course of, or under, a contract with the U.S. Atomic Energy Commission.

The present invention relates generally to ionizing radiation and particle detection by position-sensitive proportional counters and more particularly to a counter which locates the position where radiation strikes the detector's sensitive area.

Prior to the recent development of position-sensitive detectors of ionizing radiation using rise-time measurements, particle position detection was accomplished by means of a resistive collector element having a readout electrode on each end of the element. The position of the incoming particle was determined by amplitude ratio of the signals obtained at the respective electrodes. These detectors were limited in detection accuracy because of dependency on an analog pulse divider circuit.

In view of this deficiency in the art, applicants developed a position-sensitive counter which did not use such an analog pulse divider, measuring the position by means of the rise time of a pulse from a highly resistive collector. This invention is the subject of U.S. Pat. application Ser. No. 680,428, filed Nov. 3, 1967, now Pat. No. 3,483,377, issued Dec. 9, 1969, entitled "Position Sensitive Radiation Detector" and incorporated herein reference thereto as to the disclosure of common subject matter not herein described in detail.

Applicants having a knowledge of the deficiencies in the art of two dimensional position-sensitive detectors and realizing the need for a highly sensitive two dimensional position-sensitive detector have developed a two-dimensional position-sensitive detector which consists of a plurality of highly resistive collector wires mounted in a proportional counter envelope in an ordered array and electrically interconnected at the ends to form a four terminal output wherefrom the rise times of the pulses can be compared in a unique circuit arrangement using crossover timing techniques as disclosed in the above-referenced application to provide accurate position indication for even low energy ionizing events.

It is known in the art to provide two dimensional measurement by means of connecting an amplifier and a pulse height analyzer to each row and column output of multiple highly conductive collectors formed in a matrix array. A typical example of this type of two dimensional detector is described in U.S. Pat. No. 3,415,992, issued Dec. 10, 1968, to Reinitz, entitled "Extended Area Semiconductor Radiation Detectors and a Novel Readout Arrangement. " The disadvantage with this type of arrangement is the number of pulse amplifiers and pulse height analyzers required to operate the detector.

Summary of the Invention

In view of above-described deficiencies in the art it is an object of this invention to provide a two dimensional position-sensitive radiation detector, the sensitivity of which is not dependent upon the position and energy of the incident radiation.

It is another object of the present invention to provide a two dimensional detector wherein a plurality of highly resistive collector wires are disposed in a proportional counter chamber in an ordered array and interconnected by means of resistor network so as to provide a four terminal output from which the comparison of the rise times of the pulses obtained at the four outputs gives the coordinates of an ionizing event within the array.

Other objects and many of the attendant advantages of the present invention will be evident from the following detailed description and the accompanying drawings.

Detailed Description of the Preferred Embodiment

Figure 1:
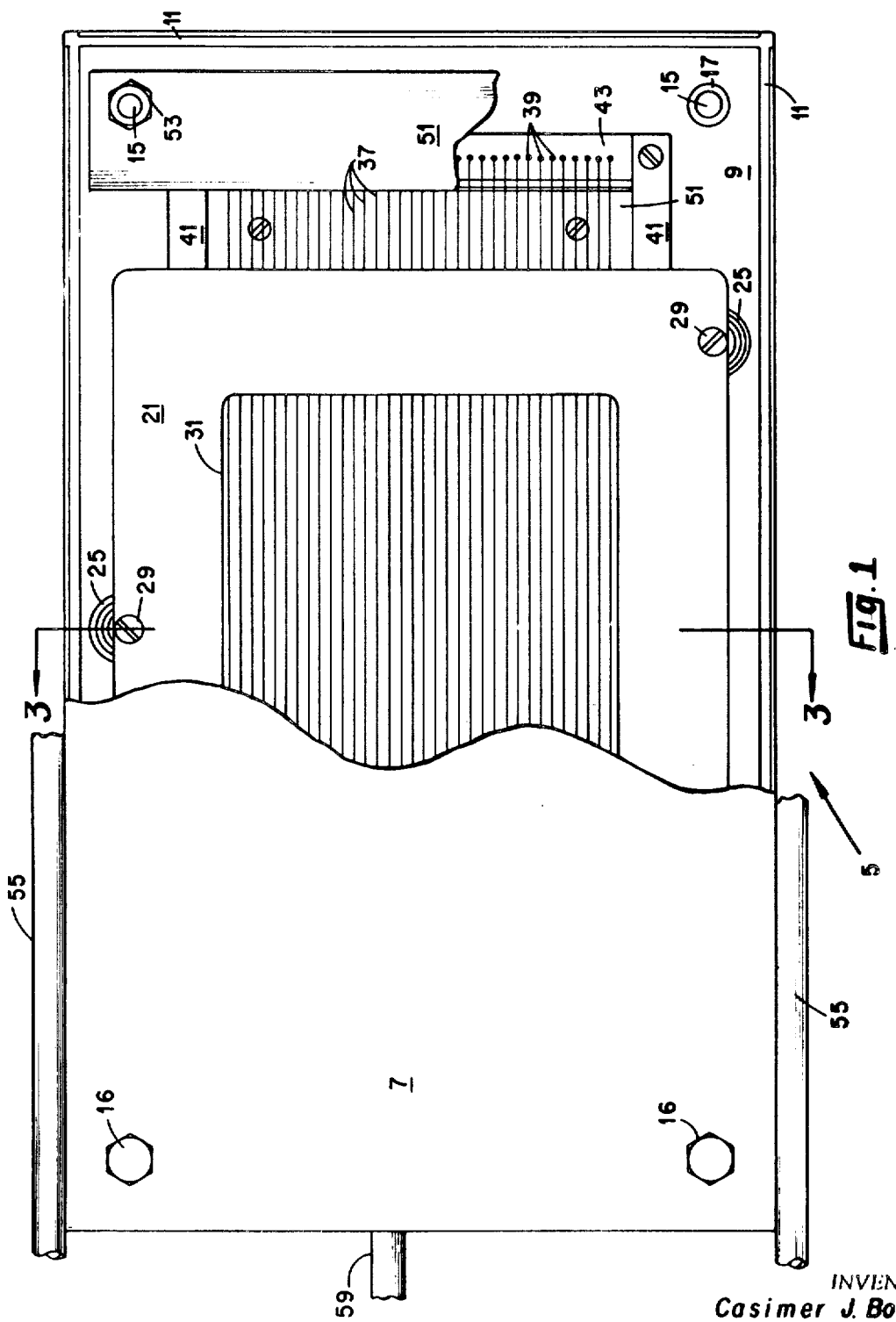
FIG. 1 is a top view partially in section of a 30–wire two dimensional position-sensitive proportional counter according to the present invention.
Figure 2:
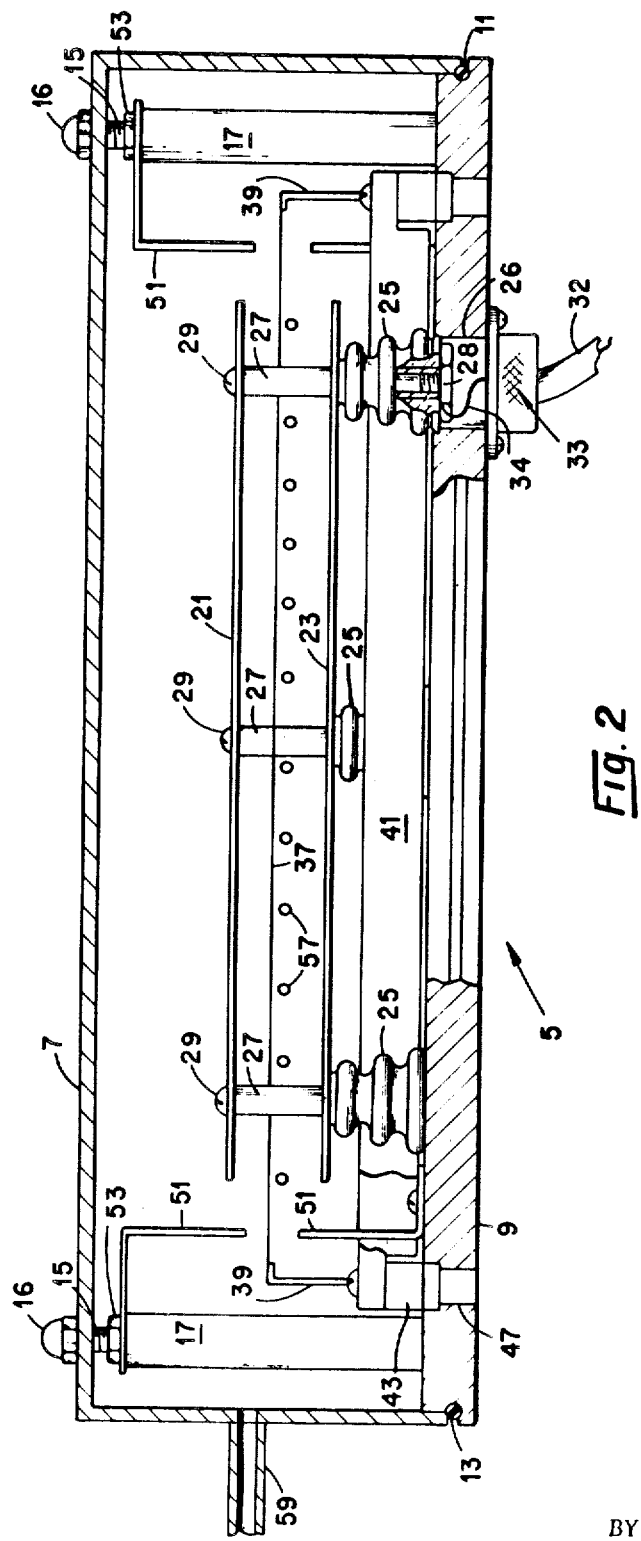
FIG. 2 is a side view partially in section of the counter shown in FIG. 1.
Figure 3:
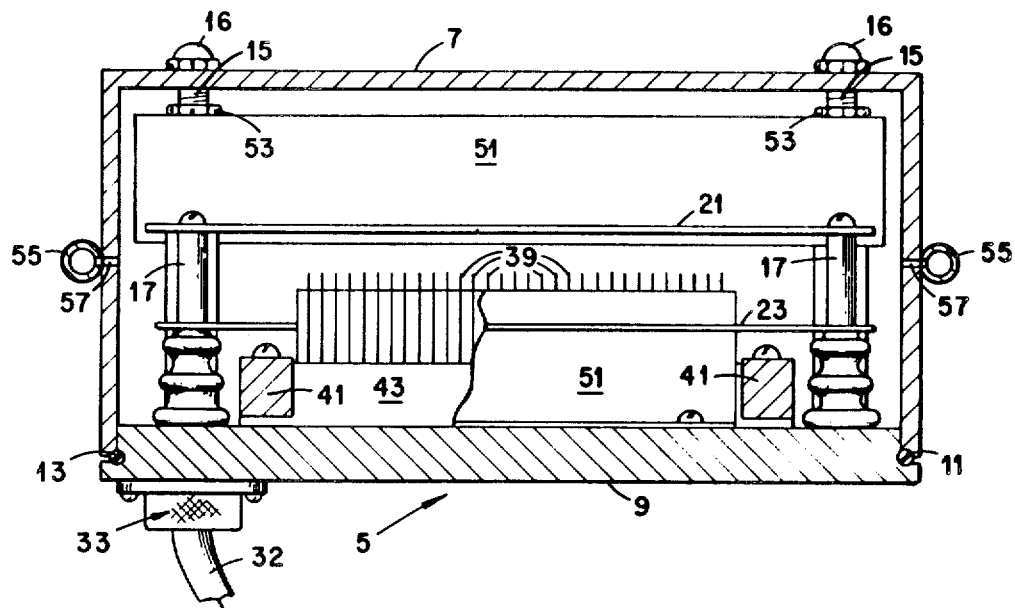
FIG. 3 is a sectional end view of the counter taken along lines 3—3 of FIG. 1.

Referring now to FIGS. 1, 2 and 3, there is shown a gas flow through proportional counter unit 5. As shown, the counter consists of a rectangular base plate 9 which is constructed from an electrically conductive material, such as aluminum, and has a channel 11 into which is placed a peripheral rubber seal 13. The enclosure cover 7 is in the form of a rectangular open box which firs over the base member 9 to enclose the counter. The lower edges of the cover are aligned so as to butt against the seal 13 thereby sealing the counter enclosure. The cover 7 is held in place against the seal by means of cap nuts 16 and screws 15 which extend upward from spacing studs 17. Each of the spacing studs is rigidly mounted to the base member 9 at the four corners, respectively.

The electric field within the counter is produced by means of a pair of parallel conductive field plates 21 and 23 connected to a high voltage supply (not shown). The plates are mounted above the base member 9 by means of three insulator posts 25 which are rigidly mounted in apertures 26 of the base plate 9. The field plates are spaced apart by means of conductive spacers 27 and the whole assembly is mounted by means of screws 29 extending through the spacers 27 into the insulator post 25 and secured by means of nuts 28, one of which is shown in detail in FIG. 2. The field plate voltage is typically in the range of from 500 to 2500 volts. The voltage is supplied to the plates by means of a coaxial lead 32 connected through the coaxial connector 33 secured to the base member in alignment with corresponding aperture 26. As shown in detail in FIG. 2, the inner conductor 34 of the connector is connected to the screw 29 thereby distributing the bias voltage to the field plates 21 and 23. The grounded shield conductor of the coaxial lead is connected to the counter base plate through the connector housing in a conventional manner and serves as a ground connection to the entire counter enclosure.

As shown in FIG. 1, the top plate 21 may have a rectangular opening 31 forming a window defining the sensitive area of the counter 5. Depending upon the type of radiation to be detected, this window may be covered with various conventional electrically conductive foils (not shown) to allow the radiation to penetrate the sensitive area of the counter.

The sensitive area of the counter is traversed by a plurality of highly resistive collector wires 37 tightly strung at spaced intervals between collector wire conductive mounting posts 39. The collector wires are held in a plane parallel array intermediate the field plates 21 and 23. Although a 30–wire counter is shown as the example in the figures, there is no limitation as to the number of wires and size of the counter, and may be varied according to the size of the sensitive area required for a particular application. Typically, the collector wires are a commercially available pyrolytic carbon coated quartz fiber. These wires are typically 1 mil (0.001 inch) in diameter and the spacing between the wires may be in the order of 1 mm. (0.04 inch). The wires are connected to the post 39 in the following manner: first, the tips of the posts are bent, as shown in FIG. 2, in the direction parallel to the wire position; second, the wires are bonded to the post along the bent tip with epoxy resins; and third, the bonded area is silvered to electrically connect the wires to the mounting posts. In the example shown, the wires are strung between mounting posts that are approximately 7 inches apart and the collector wire assembly is held together by means of two spacer bars 41 connected to insulated mounting post bases 43. The bases 43 may be conventional circuit board connectors so that resistors 45 (FIG. 4) connected between the ends of the collector wires may be mounted on circuit boards (not shown) and plugged into the mounting bases 43. The collector wire assembly is mounted on the base plate 9 by sealably bonding the mounting posts bases in slots 47 in the base plate 9 allowing access for the circuit boards to be plugged into the bases 43 from outside the counter.

Each of the end mounting pin assemblies is shielded from the high bias voltage applied to the field plates 21 and 23 by means of field conforming and shielding plates 51. Each plate is formed of two L-shaped plates, one mounted one mounted to the base 9 and the other held by nuts 53 tightened against the spacer posts 17. The spacing between the plates forms a slot through which the collector wires extend to the mounting post 39.

The ionizable gas is supplied to the counter enclosure by means of supply manifolds 55 welded along each side of the cover 7 which communicates with a plurality of small fill inlets 57 along the cover walls. The gas is allowed to exhaust from the counter through an exhaust port 59 located at one end of the counter cover 7.

Figure 4:
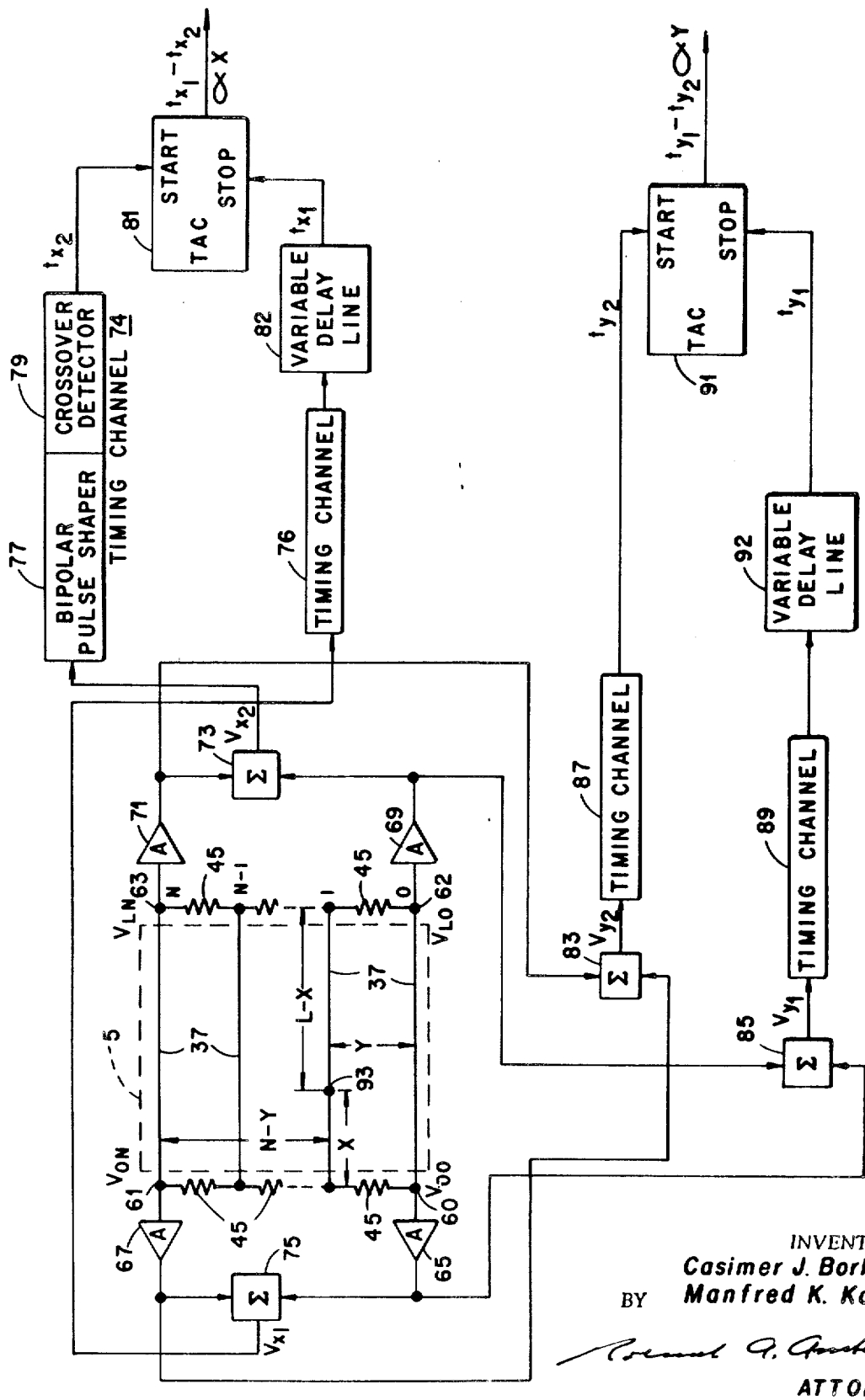
FIG. 4 is a schematic diagram of the complete detector system including the counter collector wire array of FIG. 1.

Having described a specific embodiment of a two dimensional position-sensitive counter designed in accordance with the teachings of the present invention, the overall detector system will now be described with reference to FIG. 4. Although any number of collector wires may be used, depending upon the particular application, for the purpose of simplifying the drawing only 4 wires are shown in FIG. 4. As shown each collector wire 37 contained within the counter 5 is connected to the adjacent wire at each end by means of resistors 45. The resistors are typically in the range of from 0.5 to 50 kilohms depending upon the total number of the collector wires 37. The resistor networks form output terminals 60, 61, 62 and 63 from which the counter signals are taken. Terminals 60 and 61 are connected to the input of pulse amplifiers 65 and 67, respectively, while terminals 62 and 63 are connected to the input of pulse amplifiers 69 and 71, respectively. A first summing network 73 is connected to receive the outputs of amplifiers 69 and 71 at respective inputs. A second summing network 75 is connected to receive the outputs of amplifiers 65 and 67 at respective inputs. The output of summing network 73 is connected to the input of a timing channel 74 consisting of a bipolar pulse shaper 77 which shapes the input pulse into a bipolar pulse having a zero base voltage crossover time which varies in accordance with the rise time of the input and a crossover detector 79 connected to the output of the pulse shaper 77. Typically, the bipolar pulse shaper 77 consists of an amplifier, two RC differentiators and one RC integrator with identical time constants as described in applicants' referenced patent.

The output of summing circuit 75 is connected to a timing channel 76 identical to that of timing channel 74. The output of channel 74 is connected to the "start" input of a conventional time-to-amplitude converter (TAC) 81 and the output of channel 76 is connected to the "stop" input of TAC 81 through a variable delay line 82, the purpose of which will be described later. The output of TAC 81 is then a signal whose amplitude is proportional to the position of an ionizing event within the counter collector array along the X-axis as will be later described in detailed description of the operation.

The position of the event along the Y-axis (across the wires) is detected by circuits identical to that described above for the X-axis detector. The outputs of amplifiers 65 and 69 are connected to respective inputs of a summing network 85 while the outputs of amplifiers 67 and 71 are connected to respective inputs of a summing network 83. The outputs of networks 83 and 85 are connected to the inputs of timing channels 87 and 89, respectively. Timing channels 87 and 89 are both identical to that of channel 74 shown in detail. The output of channel 87 is connected to the "start" input of a TAC 91 and the output of channel 89 is connected to the "stop" input through a variable delay line 92. The output of TAC 91 is then a signal whose amplitude is proportional to the position of the ionizing event along the Y-axis.

In operation for the detection of alpha particles, for example, a thin foil such as metallized Mylar is placed over the window opening 31 of the top field plate 29. A similar thin foil window (not shown) in the cover 7 may also be required, depending upon the shielding properties of the cover material with respect to the radiation being detected. The counter is placed in position for detection so that the window is exposed to the area from which the radiation is to be detected and an ionizable gas, such as an argon-methan mixture, from a source not shown, is supplied to the manifold 55, filling the enclosure volume and continually flowing through the counter enclosure and out the exhaust port 59. Once the enclosure is filled with the ionizable gas, an alpha particle entering the sensitive region of the counter ionizes the gas in a region near the path of the particle and places a charge on the collector wires nearest the ionized region, as for example, at the point 93 shown in FIG. 4. Since the collector wires have a very high resistance per unit length, for example, 250 kilohms per inch and due to the distributed wire to wall capacitance, an event within the counter sensitive area cause pulses to appear at the four output terminals 60-63 whose rise times vary depending upon the position of an event within the array.

The various signal terminals 60 to 63 may be defined according to their location as follows:

$V_{oo}$ at X=0, Y=0;
$V_{oN}$ at X=0, Y=N;
$V_{LN}$ at X=L, Y=N; and
$V_{Lo}$ at X=L, Y=0 where L is the length of the wires and N is the number of wires making up the array. Assuming the measurements to be made as to their position from the left end of the counter in the X direction and from the bottom of the counter in the Y direction, the output signal $V_{x_1}$ of summing network 75 will be:

$V_{x_1} = V_{oo} + V_{oN}$, at X=0, and the output of network 73 will be $V_{x_2} = V_{Lo} + V_{LN}$, at X=L.

Similarly, the outputs of summing circuits 85 and 83 may be defined as follows:

$V_{y_1} = V_{oo} + V_{Lo}$ at Y=0
$V_{y_2} = V_{oN} + V_{LN}$ at Y=N.

Accordingly, it will be seen that the output of summing network 75 ($V_{x_1}$) is a signal whose rise time is determined by the sum of the terminal voltages at 60 and 61. Likewise, the output of summing network 73 ($V_{x_2}$) is a signal whose rise time is determined by the sum of the terminal voltages at 62 and 63. Therefore, by comparing the rise time of the signal $V_{x_1}$ and $V_{x_2}$ it will be seen that the TAC 81 output pulse amplitude is proportional to the X position. Since it is desired that the TAC output signal be zero for an event detected at X=0, i.e., define the origin, the variable delay line 82 is adjusted so that the "stop" signal ($t_{x_1}$) from the crossover detector of channel 76 is coincident with the "start" signal ($t_{x_2}$) from the crossover detector of channel 74. Accordingly, it will be seen that as the incident radiation moves along the X axis from the origin the amplitude of the TAC 81 output will increase as the distance along the X axis increases.

Similarly, it will be seen that the output of the Y axis of TAC 91 can be reduced to zero for an event at Y=0 by adjusting the variable delay line 92, and as the event is moved along the Y coordinate the output of TAC 91 will increase in amplitude as the distance along the Y-axis is increased.

Assume now that an event occurs at the point 93 shown in FIG. 4. A pulse is obtained at the output of summing network 73 which has a rise time proportional to the distance L-X. This pulse is shaped by the bipolar pulse shaper 77 to obtain a zero level crossover pulse at the output which is detected by the crossover detector 79. The crossover detector generates an output pulse coincident with the bipolar pulse zero crossover time ($t_{x_2}$) which is applied to the "start" input of TAC 81 to start the conversion period.

Simultaneously, the $V_{x_1}$ pulse representing the X distance is shaped into a bipolar pulse and its zero crossover time is detected by channel 76 to provide an output pulse at zero crossover at time $t_{x_1}$. This pulse is then delayed by the delay line 82 as originally set and is then applied to the "stop" input of TAC 81 to stop the conversion period. Thus, it will be seen that by providing the delay line 82 the output of TAC 81 is always a signal proportional to the distance X from the left of the counter 5.

The position of the event in the Y direction is obtained in the same way as that just described for the X direction. The only difference is that the timing channel 87 provides the $t_{y_2}$ pulse and the timing channel 89 provides the $t_{y_1}$ pulse. The output from TAC 91 is a voltage pulse the amplitude of which is proportional to the distance Y.

Additional circuitry (not shown) may be added to obtain energy information. For example, an additional summing network may be connected with its two inputs coupled to the outputs of summing networks 73 and 75, respectively. The output of this summing network is a sum of both the X and Y signals that is practically position independent over part of its frequency spectrum but has an amplitude proportional to the energy loss of the detected event in the counter.

In a test of the above-described invention, a collimated alpha particle beam from a $^{210}$Po source was allowed to pass through the sensitive region of a 30-wire counter. The measured spread in position was determined to be 0.2 mm. (fwhm) in the X direction (along the wires) and one wire spacing (2.5 mm.) in the Y direction (across the wires). This provided a minimum of 30,000 resolution elements, each of a size of 0.2 mm. ×1 wire spacing.

Although the invention has been described by way of illustration, it will be obvious to those skilled in the art that many modifications may be made in accordance with the teachings as set forth above. For example, the detector wire array need not be limited to spatial detection in cartesian coordinates but may be arrayed as a polar coordinate system by placing the collector wires in an evenly spaced radial array extending outward from the origin.

A further extension of the flexibility mount placement of the collector wires would be to mount the wires in an axially aligned circular array within a cylindrical counter envelope. This would allow one to measure reflections from a crystal in X-ray diffraction using a geometry similar to the Weissenberg camera. In either case the collector wires are connected at the ends by means of resistor networks, as in the example, to form a four-terminal output and the measurements are made in the same manner. In general, any geometric form, generated by straight lines can be obtained with the array of collector wires.

The particular gas used in the counter and the particular window material used would also depend upon the type of radiation to be measured. For example, when detecting X-rays, the gas may be a krytpon-methan mixture. The particular gas necessary for the best results in detecting a particular radiation is well known in the art and therefore need not be discussed here in any greater detail.

Thus, it will be seen that a very versatile two-dimensional position-sensitive detector has been provided which takes advantage of the use of applicants' earlier discovery of high resistive collectors to greatly increase spatial resolution in the detection of radiation. Applicants' device is particularly advantageous for low energy detection application such as detecting the location of radioactive tracers in medical application, health physics applications where it may be used for monitoring and locating radiation over a large area, for example, along a floor or wall.

Obviously, many embodiments and applications will be envisioned by those skilled in the art which do not depart from the spirit and scope of the present invention. Therefore, the present embodiment should be considered in all respects as illustrative only and not restrictive and all changes which come within the meaning and range of equivalency of the claims are therefore intended to be embraced therein.

What I claim is:

1. A two-dimensional position-sensitive radiation detector, comprising:
    an ionizable gas-filled counter envelope;
    a plurality of elongated high resistive collector wires disposed within said gas-filled envelop in an ordered array;
    a plurality of resistors connected respectively between both the adjacent ends of each of said collector wires, thereby forming four output terminals;
    a first summing network having an output equal to the sum of the inputs thereto having its inputs connected between first and second terminals of said four output terminals;
    a second summing network having an output equal to the sum of the inputs thereto having its inputs connected between said third and fourth terminals of said four output terminals;
    a first pulse detector means connected between said outputs of said first and second summing networks and responsive to the rise time of said output pulses from said first and second summing networks for providing a pulse which is indicative of the position of an ionizing event along said collector wires;
    a third summing network having an output equal to the sum of the inputs applied thereto having its inputs connected between said first and third output terminals of said four output terminals;
    a fourth summing network having an output equal to the sum of the inputs applied thereto having its inputs connected between said second and fourth terminals of said four outputs terminals; and
    a second pulse detector means connected between the outputs of said third and fourth summing networks and responsive to the rise time of said output pulses from said third and fourth summing networks for providing a pulse which is indicative of the position of said event between said wires.

2. A two dimensional position-sensitive detector as set forth in claim 1 further including first, second, third and fourth pulse amplifiers connected in series with said first, second, third and fourth output terminals, respectively.

3. A two dimensional position-sensitive detector as set forth in claim 2 wherein said counter enclosure includes a pair of parallel spaced-apart electric field producing plates and said plurality of highly resistive collector wires are disposed in a parallel array intermediate the spacing between said parallel field plates.

4. A two dimensional position-sensitive detector as set forth in claim 3 wherein each of said first and second pulse detector means includes first and second timing channels connected to respective outputs of said summing networks, each of said timing channels providing an output pulse at a time dependent upon the rise time of the input pulse applied thereto from said summing networks, a variable delay line connected in series with the output of said second timing channel for orienting the outputs of said timing channels as to the position of an event detected by said counter, and a time-to-amplitude converter having a "start" input connected to the output of said first timing channel and a "stop" input connected to the output of said delay line.

5. A two dimensional position-sensitive detector as set forth in claim 4 wherein each of said timing channels includes a bipolar pulse shaper connected to the respective summing network output, said bipolar pulse shaper having an output pulse which crosses the zero-base voltage line at a time dependent upon the rise time of the pulse applied thereto, and a crossover detector connected to the output of said bipolar pulse shaper which produces an output pulse at a time coincident with the zero level crossover time of said bipolar pulse applied to the input thereof.

6. A two dimensional position-sensitive detector as set forth in claim 5 wherein said counter is of the gas flow-through type and said counter envelope includes a gas supply manifold for supplying said ionizable gas to said counter envelope and an exhaust port through which said gas is allowed to escape from said envelope.

7. A two dimensional position-sensitive detector as set forth in claim 6 wherein said field plates and said collector wires are disposed in a plane parallel array.

8. A two dimensional position-sensitive detector as set forth in claim 7 wherein said four output terminals are taken at the four corners of said plane parallel collector wire array.